US011907109B2

(12) United States Patent
Wang et al.

(10) Patent No.: US 11,907,109 B2
(45) Date of Patent: Feb. 20, 2024

(54) HIERARCHICAL CLUSTERING OF TEST CASES FOR USE IN GENERATING TESTING PLANS FOR INFORMATION TECHNOLOGY ASSETS

(71) Applicant: Dell Products L.P., Round Rock, TX (US)

(72) Inventors: Nan Wang, Chengdu (CN); Chi Chen, Chengdu (CN); Jing Ye, Chengdu (CN); Yang Wu, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 17/735,223

(22) Filed: May 3, 2022

(65) Prior Publication Data

US 2023/0333968 A1    Oct. 19, 2023

(30) Foreign Application Priority Data

Apr. 15, 2022    (CN) .......................... 202210401205.5

(51) Int. Cl.
    *G06F 11/36*     (2006.01)
    *G06F 18/23*     (2023.01)
    *G06N 20/00*     (2019.01)

(52) U.S. Cl.
    CPC ...... *G06F 11/3684* (2013.01); *G06F 11/3676* (2013.01); *G06F 11/3688* (2013.01); *G06F 18/23* (2023.01); *G06N 20/00* (2019.01)

(58) Field of Classification Search
    CPC .... G06F 8/3676; G06F 8/3684; G06F 8/3688; G06F 8/3692

(Continued)

(56) References Cited

U.S. PATENT DOCUMENTS

| 11,221,942 B2 * | 1/2022 | Sridhar | .................. G06N 20/00 |
| 2010/0287534 A1 * | 11/2010 | Vangala | .............. G06F 11/3612 |
| | | | 717/124 |

OTHER PUBLICATIONS

Ryan, Conor, et al., Hierarchical Clustering Driven Test Case Selection in Digital Circuits, In Proceedings of the 16th International Conference on Software Technologies (ICSOFT2021), 2021, 8 pages, [retrieved on Sep. 27, 2023], Retrieved from the Internet: <URL:https://www.scitepress.org/Papers/2021/106058/106058.pdf>.*

(Continued)

*Primary Examiner* — Geoffrey R St Leger
(74) *Attorney, Agent, or Firm* — Ryan, Mason & Lewis, LLP

(57) ABSTRACT

An apparatus comprises a processing device configured to obtain testing logs generated by executing test cases on information technology assets of an information technology infrastructure, to parse the testing logs to generate a set of log event templates for testing actions performed during execution of the test cases on the information technology assets of the information technology infrastructure, to generate vector representations of the test cases utilizing the generated set of log event templates, and to perform, utilizing one or more machine learning-based hierarchical clustering algorithms that take as input the generated vector representations of the test cases, hierarchical clustering of the plurality of test cases. The processing device is also configured to generate, based at least in part on the hierarchical clustering results, testing plans for a given information technology asset of the information technology infrastructure.

20 Claims, 15 Drawing Sheets

(58) Field of Classification Search
USPC .......................................................... 717/124
See application file for complete search history.

(56) References Cited

OTHER PUBLICATIONS

Balamurugan, R., Optimized Fuzzy Hierarchical Clustering based Automated Test case generation for Improving Regression Testing on Mobile Apps, Juni Khyat, vol. 10 Issue-6 No. 9, Jun. 2020, 18 pages, [retrieved on Oct. 4, 2023], Retrieved from the Internet: <URL:https://junikhyatjournal.com/no_9_jun_20/8.pdf>.*
Chen, Zhichao, et al., Exploring Better Black-Box Test Case Prioritization via Log Analysis, ACM Transactions on Software Engineering and Methodology, Jan. 2022, 34 pages, [retrieved on Sep. 27, 2023], Retrieved from the Internet: <URL:http://dl.acm.org/>.*
F. Murtagh et al., "Methods of Hierarchical Clustering," arXiv:1105.0121v1, Apr. 30, 2011, 21 pages.
A. K. Singh et al., "Vectorization of Text Documents for Identifying Unifiable News Articles," International Journal of Advanced Computer Science and Applications, vol. 10, No. 7, Jul. 2019, pp. 305-310.
J. Lilleberg et al., "Support Vector Machines and Word2vec for Text Classification with Semantic Features," International Conference on Cognitive Informatics & Cognitive Computing, Jul. 6, 2015, pp. 136-140.
F. Murtagh et al., "Algorithms for Hierarchical Clustering: An Overview, II," Interdisciplinary Reviews: Data Mining and Knowledge Discovery, vol. 7, No. 6, Jul. 29, 2017, 28 pages.
F. Murtagh et al., "Algorithms for Hierarchical Clustering: An Overview," WIREs Data Mining and Knowledge Discovery, vol. 9, Jan./Feb. 2011, 12 pages.

* cited by examiner

LOG TEMPLATE DICTIONARY
500

| 1 | 2 | 3 | ... | $i$ | ... | $d_m$ |
|---|---|---|-----|-----|-----|-------|
| $ET_1$ | $ET_2$ | $ET_3$ | $ET_{...}$ | $ET_i$ | $ET_{...}$ | $ET_{d_m}$ |

CONVERTED LOG EVENT TEMPLATES
505

$LT_1 = [D(ET_1), D(ET_1), D(ET_3), D(ET_3), D(ET_3), D(ET_2), D(ET_i), D(ET_D), D(ET_{...}), D(ET_i), D(ET_3)]$
$\quad = [1,1,3,3,3,2,i,D,...,i,3]$ $LT_2 = [D(ET_3), D(ET_1), D(ET_2), D(ET_1), D(ET_1), D(ET_i), D(ET_i), D(ET_{...}), D(ET_{d_m})]$
$\quad = [3,1,2,1,1,i,i,...,D]$ $LT_K = [D(ET_3), D(ET_1), D(ET_2), D(ET_i), D(ET_{...}), D(ET_{d_m})]$
$\quad = [3,1,2,1,1,i,i,...,d_m]$

LOG TEMPLATE DICTIONARY WITH ZERO ELEMENT
510

| 0 | 1 | 2 | 3 | ... | $i$ | ... | $d_m$ |
|---|---|---|---|-----|-----|-----|-------|
| $ET_0$ | $ET_1$ | $ET_2$ | $ET_3$ | $ET_{...}$ | $ET_i$ | $ET_{...}$ | $ET_{d_m}$ |

ALERT appliance Info Appliance port pairs are connected to different data switches.
ALERT node Major Order of node port cabling to the data switches is not correct: first port
ALERT node Major Order of node port cabling to the data switches is not correct: first port
ALERT node Info Node port cabling order is correct.
ALERT appliance Major Appliance port pairs are connected to the same data switch: second port of 4-Port
ALERT node Info Node port cabling order is correct.
ALERT appliance Major Appliance port pairs are connected to the same data switch: first port of 4-Port
ALERT appliance Minor Management ports are connected to the same management switch e4:f0:04:a5:0a:bd.
ALERT appliance Major Appliance port pairs are connected to the same data switch: first port of 4-Port
KILLING Kill-98050980510080512
KILLING Kill-9547835478454786
ALERT appliance Info Management ports are properly connected to different management switches.
ALERT appliance Minor Management ports are connected to the same management switch e4:40:04:a5:0a:bd.
ALERT node Major Order of node port cabling to the data switches is not correct: first port
ALERT appliance Info Appliance port pairs are connected to different data switches.
ALERT appliance Info Management ports are properly connected to different management switches.
ALERT node Info Node port cabling order is correct.
ALERT appliance Major Appliance port pairs are connected to the same data switch: first port of 4-Port

QA_ACTION [MODIFY:NODE] Appliance-WX-D0578-node-B changing reboot setting to on
QA_ACTION [MODIFY:NODE] Appliance-WX-D0578-node-B changing reboot setting to on
QA_ACTION [MODIFY:NODE] Appliance-WX-D0578-node-A changing reboot setting to on
QA_ACTION [MODIFY:NODE] Appliance-WX-D0578-node-B changing reboot setting to on
QA_ACTION [MODIFY:NODE] Appliance-WX-D0578-node-A changing reboot setting to on
QA_INFO [nc5135084] Running:taskset-c1-7,9-15 btest-D-T1-t40-global_dedup-860000-r10
QA_INFO [nc5135083] Running:taskset-c1-7,9-15 btest-D-T1-t40-global_dedup-860000-r10
QA_INFO [nc5135083] Running:taskset-c1-7,9-15 btest-D-T1-t40-global_dedup-860000
QA_INFO [nc5135083] Running:taskset-c1-7,9-15 btest-D-T1-t40-w1--global_dedup-860000
QA_INFO [nc5135084] Running:taskset-c1-7,9-15 btest-D-T1-t40-w1--global_dedup-860000
QA_ACTION [INSERT:Dae] Trying to power on slot 5 of A1-ExpansionEnclosure_1_0
QA_ACTION [INSERT:Dae] Trying to power on slot 5 of A1-ExpansionEnclosure_1_0
QA_ACTION [INSERT:Dae] Trying to power on slot 5 of A1-ExpansionEnclosure_1_0
DARE_DISK_LOCKED_OUT DRV:0_0_0 PM_SLOT_STATE_ENCRYPTED_LOCKED
DARE_DISK_LOCKED_OUT DRV:0_0_1 PM_SLOT_STATE_ENCRYPTED_LOCKED
DARE_DISK_LOCKED_OUT DRV:0_0_2 PM_SLOT_STATE_ENCRYPTED_LOCKED
DARE_DISK_LOCKED_OUT DRV:0_0_3 PM_SLOT_STATE_ENCRYPTED_LOCKED
DARE_DISK_LOCKED_OUT DRV:0_0_4 PM_SLOT_STATE_ENCRYPTED_LOCKED

FIG. 6B 605-1

ALERT appliance Info Appliance port pairs are connected to different data switches.
ALERT node Major Order of node port cabling to the data switches is not correct: first port
ALERT node Major Order of node port cabling to the data switches is not correct: first port
ALERT node Info Node port cabling order is correct.
ALERT appliance Major Appliance port pairs are connected to the same data switch: second port of 4-Port
ALERT node Info Node port cabling order is correct.
ALERT appliance Major Appliance port pairs are connected to the same data switch: first port of 4-Port
ALERT appliance Minor Management ports are connected to the same management switch e4:f0:04:a5:0a:bd
ALERT appliance Major Appliance port pairs are connected to the same data switch: first port of 4-Port
KILLING Kill-9805098051080512
KILLING Kill-954783547854786
ALERT appliance Info Management ports are properly connected to different management switches.
ALERT appliance Minor Management ports are connected to the same management switch e4:f0:04:a5:0a:bd
ALERT node Major Order of node port cabling to the data switches is not correct: first port
ALERT appliance Info Appliance port pairs are connected to different data switches.
ALERT appliance Info Management ports are properly connected to different management switches.
ALERT node Info Node port cabling order is correct.
ALERT appliance Major Appliance port pairs are connected to the same data switch: first port of 4-Port

FIG. 6C

```
QA_ACTION [MODIFY:NODE] Appliance-WX-D0578-node-B changing reboot setting to on
QA_ACTION [MODIFY:NODE] Appliance-WX-D0578-node-B changing reboot setting to on
QA_ACTION [MODIFY:NODE] Appliance-WX-D0578-node-A changing reboot setting to on
QA_ACTION [MODIFY:NODE] Appliance-WX-D0578-node-B changing reboot setting to on
QA_ACTION [MODIFY:NODE] Appliance-WX-D0578-node-A changing reboot setting to on
QA_INFO [nc5135084] Running:taskset-c1 7,9,15 btest-D-T1-t40-global_dedup-860000-r10
QA_INFO [nc5135083] Running:taskset-c1 7,9,15 btest-D-T1-t40-global_dedup-860000-r10
QA_INFO [nc5135083] Running:taskset-c1 7,9,15 btest-D-T1-t40-global_dedup-860000-r10
QA_INFO [nc5135083] Running:taskset-c1 7,9,15 btest-D-T1-t40-w1--global_dedup-860000
QA_INFO [nc5135084] Running:taskset-c1 7,9,15 btest-D-T1-t40-w1--global_dedup-860000
QA_ACTION [INSERT:Dae] Trying to power on slot 5 of A1-ExpansionEnclosure_1,1,0
QA_ACTION [INSERT:Dae] Trying to power on slot 5 of A1-ExpansionEnclosure_1,1,0
QA_ACTION [INSERT:Dae] Trying to power on slot 5 of A1-ExpansionEnclosure_1,1,0
DARE_DISK_LOCKED_OUT DRV:0_0_0 PM_SLOT_STATE_ENCRYPTED_LOCKED
DARE_DISK_LOCKED_OUT DRV:0_0_1 PM_SLOT_STATE_ENCRYPTED_LOCKED
DARE_DISK_LOCKED_OUT DRV:0_0_2 PM_SLOT_STATE_ENCRYPTED_LOCKED
DARE_DISK_LOCKED_OUT DRV:0_0_3 PM_SLOT_STATE_ENCRYPTED_LOCKED
DARE_DISK_LOCKED_OUT DRV:0_0_4 PM_SLOT_STATE_ENCRYPTED_LOCKED
```

E1: ALERT appliance Info Appliance port pairs are connected to different data switches.
E2: ALERT node Major Order of node port cabling to the data switches is not correct: first port
E3: ALERT node Info Node port cabling order is correct.
E4: ALERT appliance Major Appliance port pairs are connected to the same data switch: second port of 4:Port
E5: ALERT appliance Major Appliance port pairs are connected to the same data switch: first port of 4:Port
E6: ALERT appliance Minor Management ports are connected to the same management switch e4:10:04:a5:0a:bd.
E7: KILLING Kill-9805:9805:10805:12
E8: ALERT appliance Info Management ports are properly connected to different management switches.
E9: QA_ACTION [MODIFY:NODE] Appliance-WX-D0578-node-B changing reboot setting to on
E10: QA_ACTION [MODIFY:NODE] Appliance-WX-D0578-node-B changing reboot setting to on
E11: QA_INFO [nc5135084] Running:taskset-c1-7,9,15 btest-D-T1-t40-global_dedup-860000-r10
E12: QA_INFO [nc5135083] Running:taskset-c1-7,9,15 btest-D-T1-t40-w1--global_dedup-860000
E13: QA_ACTION [INSERT:Dae] Trying to power on slot 5 of A1-ExpansionEnclosure_1_0
E14: DARE_DISK_LOCKED_OUT DRV:0_0 PM_SLOT_STATE_ENCRYPTED_LOCKED

TEST CASE SIGNIFICANT LOG EVENT DICTIONARY
700

| E1 | E2 | E3 | E4 | E5 | E6 | E7 | E8 | E9 | E10 | E11 | E12 | E13 | E14 | E15 | E16 | E17 | E18 | E19 | E20 |
|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 |

TEST CASES
705

| TEST CASE NAME | T1 | T2 | T3 | T4 | T5 | T6 | T7 |
|---|---|---|---|---|---|---|---|
| TC1 | 15 | 15 | 1 | 6 | 4 | 2 | 5 |
| TC2 | 15 | 15 | 1 | 6 | 4 | 4 | 6 |
| TC3 | 15 | 15 | 1 | 6 | 4 | 2 | 6 |
| TC4 | 20 | 17 | 1 | 7 | 4 | 3 | 7 |
| TC5 | 18 | 16 | 1 | 6 | 4 | 3 | 6 |
| TC6 | 19 | 17 | 1 | 7 | 4 | 4 | 7 |
| TC7 | 20 | 17 | 1 | 7 | 4 | 4 | 6 |
| TC8 | 18 | 16 | 1 | 7 | 4 | 8 | 6 |
| TC9 | 14 | 14 | 1 | 6 | 4 | 3 | 6 |
| TC10 | 12 | 14 | 1 | 6 | 3 | 6 | 6 |
| TC11 | 12 | 14 | 1 | 6 | 3 | 5 | 6 |
| TC12 | 13 | 14 | 1 | 6 | 4 | 5 | 6 |
| TC13 | 12 | 14 | 1 | 6 | 3 | 5 | 6 |
| TC14 | 12 | 13 | 1 | 6 | 3 | 5 | 6 |

FIG. 7A

HIERARCHICAL CLUSTERING OF TEST CASES FOR USE IN GENERATING TESTING PLANS FOR INFORMATION TECHNOLOGY ASSETS

RELATED APPLICATION

The present application claims priority to Chinese Patent Application No. 202210401205.5, filed on Apr. 15, 2022 and entitled "Hierarchical Clustering of Test Cases for Use in Generating Testing Plans for Information Technology Assets," which is incorporated by reference herein in its entirety.

FIELD

The field relates generally to information processing, and more particularly to management of information processing systems.

BACKGROUND

Software development processes typically include multiple environments, such as one or more development environments, an integration testing environment, a staging environment, and a production environment. New software code may be created by individual developers or small teams of developers in respective ones of the development environments. The integration environment provides a common environment where software code from the multiple developers is combined and tested before being provided to the staging environment. The staging environment is designed to emulate the production environment and may be used for final review and approval before new software code is deployed in production applications in the production environment.

SUMMARY

Illustrative embodiments of the present disclosure provide techniques for hierarchical clustering of test cases for use in generating testing plans for information technology assets.

In one embodiment, an apparatus comprises at least one processing device comprising a processor coupled to a memory. The at least one processing device is configured to perform the steps of obtaining a set of testing logs generated by executing a plurality of test cases on one or more of a plurality of information technology assets of an information technology infrastructure, parsing the set of testing logs to generate a set of log event templates for testing actions performed during execution of the plurality of test cases on the one or more of the plurality of information technology assets of the information technology infrastructure, and generating vector representations of the plurality of test cases utilizing the generated set of log event templates. The at least one processing device is also configured to perform the step of performing, utilizing one or more machine learning-based hierarchical clustering algorithms that take as input the generated vector representations of the plurality of test cases, hierarchical clustering of the plurality of test cases. The at least one processing device is further configured to perform the step of generating, based at least in part on the hierarchical clustering results for the plurality of test cases, one or more testing plans for a given one of the plurality of information technology assets of the information technology infrastructure.

These and other illustrative embodiments include, without limitation, methods, apparatus, networks, systems and processor-readable storage media.

BRIEF DESCRIPTION OF THE DRAWINGS

FIG. 5 shows log template dictionaries used in converting log events into log event templates in an illustrative embodiment.

FIGS. 6A-6E show an example of processing raw test logs to generate test log vectors in an illustrative embodiment.

FIGS. 7A and 7B show an example of test case hierarchical clustering in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
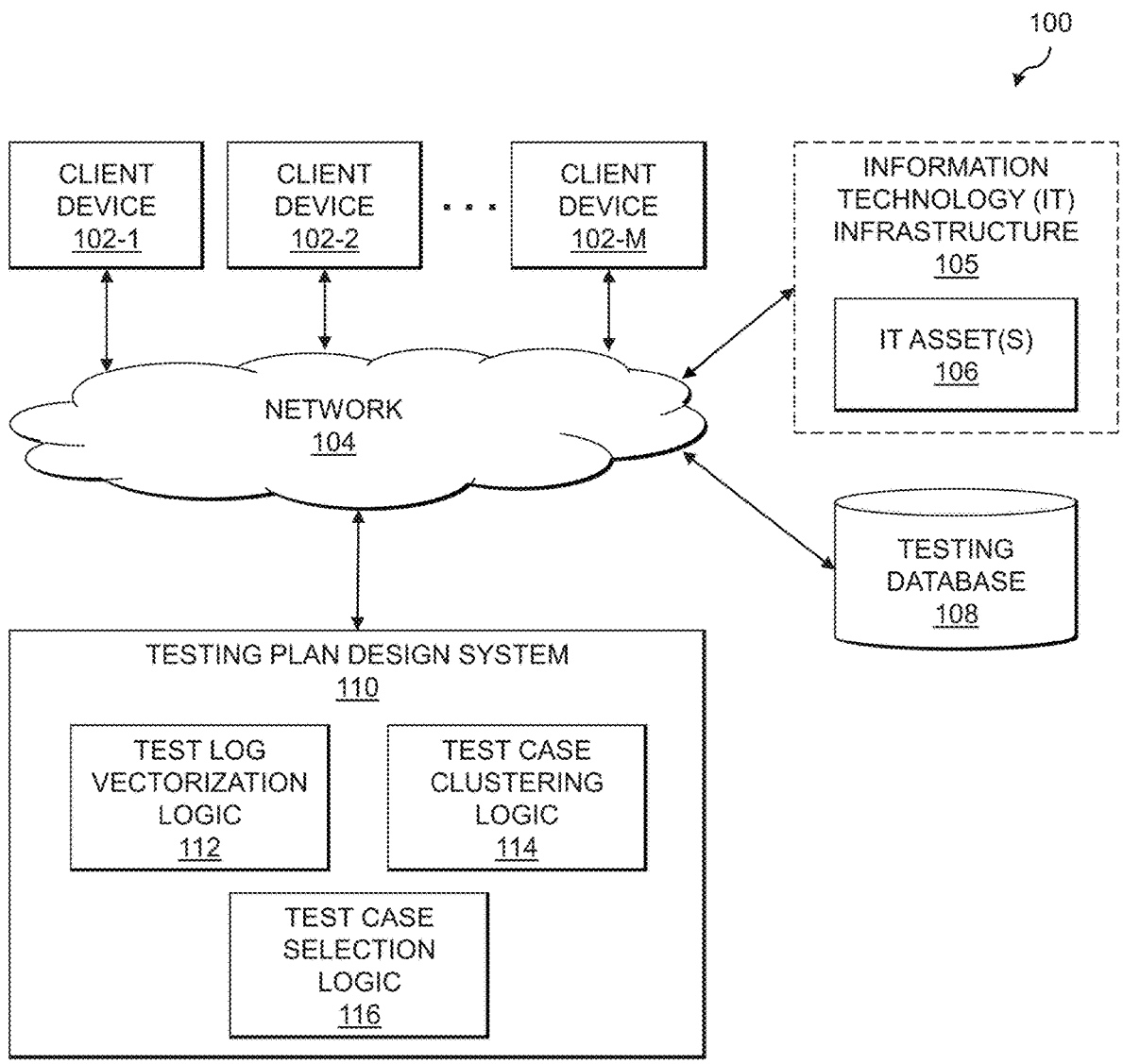
FIG. 1 is a block diagram of an information processing system configured for hierarchical clustering of test cases for use in generating testing plans for information technology assets in an illustrative embodiment.

FIG. 1 shows an information processing system 100 configured in accordance with an illustrative embodiment. The information processing system 100 is assumed to be built on at least one processing platform and provides functionality for hierarchical clustering of test cases for use in generating testing plans for information technology (IT) assets. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a testing database 108, and a testing plan design system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host applications that are utilized by respective ones of the client devices 102, such as in accordance with a client-server computer program architecture. In some embodiments, the applications comprise web applications designed for delivery from assets in the IT infrastructure 105 to users (e.g., of client devices 102) over the network 104. Various other examples are possible, such as where one or more applications are used internal to the IT infrastructure 105 and not exposed to the client devices 102. It should be appreciated that, in some embodiments, some of the IT assets 106 of the IT infrastructure 105 may themselves be viewed as applications or more generally software or hardware that is to be tested. For example, ones of the IT assets 106 that are virtual computing resources implemented as software containers may represent software that is to be tested. As another example, ones of the IT assets 106 that are physical computing resources may represent hardware devices that are to be tested.

The testing plan design system 110 utilizes various information stored in the testing database 108 in designing testing plans for use in testing the IT assets 106, applications or other software running on the IT assets 106. In some embodiments, the testing plan design system 110 is used for an enterprise system. For example, an enterprise may subscribe to or otherwise utilize the testing plan design system 110 for generating and running testing plans (e.g., on the IT assets 106 of the IT infrastructure 105, on client devices 102 operated by users of the enterprise, etc.). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The testing database 108, as discussed above, is configured to store and record various information that is used by the testing plan design system 110 in designing testing plans for use in testing the IT assets 106, applications or other software running on the IT assets 106. Such information may include, but is not limited to, information regarding test cases, testing objectives, testing points, test coverage, testing plans, etc. The testing database 108 in some embodiments is implemented using one or more storage systems or devices associated with the testing plan design system 110. In some embodiments, one or more of the storage systems utilized to implement the testing database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the testing plan design system 110, as well as to support communication between the testing plan design system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., where such management includes performing testing of the IT assets 106, or of applications or other software that runs on the IT assets 106). For example, a given one of the client devices 102 may be operated by a user to access a graphical user interface (GUI) provided by the testing plan design system 110 to manage testing plans (e.g., create, review, execute, etc.). The testing plan design system 110 may be provided as a cloud service that is accessible by the given client device 102 to allow the user thereof to manage testing plans. In some embodiments, the IT assets 106 of the IT infrastructure 105 are owned or operated by the same enterprise that operates the testing plan design system 110 (e.g., where an enterprise such as a business provides support for the assets it operates). In other embodiments, the IT assets 106 of the IT infrastructure 105 may be owned or operated by one or more enterprises different than the enterprise which operates the testing plan design system 110 (e.g., a first enterprise provides support for assets that are owned by multiple different customers, business, etc.). Various other examples are possible.

In other embodiments, the testing plan design system 110 may provide support for testing of the client devices 102, instead of or in addition to providing support for the IT assets 106 of the IT infrastructure 105. For example, the testing plan design system 110 may be operated by a hardware vendor that manufactures and sells computing devices (e.g., desktops, laptops, tablets, smartphones, etc.), and the client devices 102 represent computing devices sold by that hardware vendor. The testing plan design system 110 may also or alternatively be operated by a software vendor that produces and sells software (e.g., applications) that run on the client devices 102. The testing plan design system 110, however, is not required to be operated by any single hardware or software vendor. Instead, the testing plan design system 110 may be offered as a service to provide support for computing devices or software that are sold by any number of hardware or software vendors. The client devices 102 may subscribe to the testing plan design system 110, so as to provide support for testing of the client devices 102 or software running thereon. Various other examples are possible.

In some embodiments, the client devices 102 may implement host agents that are configured for automated transmission of information regarding state of the client devices 102 (e.g., such as in the form of testing logs periodically provided to the testing database 108 and/or the testing plan design system 110). Such host agents may also or alternatively be configured to automatically receive from the testing plan design system 110 commands to execute remote actions (e.g., to run various test cases on the client devices 102 and/or the IT assets 106 of the IT infrastructure 105). Host agents may similarly be deployed on the IT assets 106 of the IT infrastructure 105.

It should be noted that a "host agent" as this term is generally used herein may comprise an automated entity, such as a software entity running on a processing device. Accordingly, a host agent need not be a human entity.

The testing plan design system 110 in the FIG. 1 embodiment is assumed to be implemented using at least one processing device. Each such processing device generally comprises at least one processor and an associated memory, and implements one or more functional modules or logic for controlling certain features of the testing plan design system 110. In the FIG. 1 embodiment, the testing plan design system 110 comprises test log vectorization logic 112, test case clustering logic 114 and test case selection logic 116. The test log vectorization logic 112 is configured to obtain a set of testing logs generated by executing a plurality of test cases on one or more of the IT assets 106 of the IT infrastructure 105. The test log vectorization logic 112 is also configured to parse the set of testing logs to generate a set of log event templates for testing actions performed during execution of the plurality of test cases on the one or more IT assets 106 of the IT infrastructure 105. The test log vectorization logic 112 is further configured to generate vector representations of the plurality of test cases utilizing the generated set of log event templates. The test case clustering logic 114 is configured to perform, utilizing one or more machine learning-based hierarchical clustering algorithms that take as input the generated vector representations of the plurality of test cases, hierarchical clustering of the plurality of test cases. The test case selection logic 116 is configured to generate, based at least in part on the hierarchical clustering results for the plurality of test cases, one or more testing plans for a given one of the IT assets 106 of the IT infrastructure 105. The testing plan design system 110 is further configured, either directly or via one or more of the client devices 102, to execute the one or more testing plans on the given one of the IT assets 106 of the IT infrastructure 105.

It is to be appreciated that the particular arrangement of the client devices 102, the IT infrastructure 105 and the testing plan design system 110 illustrated in the FIG. 1 embodiment is presented by way of example only, and alternative arrangements can be used in other embodiments. As discussed above, for example, the testing plan design system 110 (or portions of components thereof, such as one or more of the test log vectorization logic 112, the test case clustering logic 114 and the test case selection logic 116) may in some embodiments be implemented internal to one or more of the client devices 102 and/or the IT infrastructure 105.

At least portions of the test log vectorization logic 112, the test case clustering logic 114 and the test case selection logic 116 may be implemented at least in part in the form of software that is stored in memory and executed by a processor.

The testing plan design system 110 and other portions of the information processing system 100, as will be described in further detail below, may be part of cloud infrastructure.

The testing plan design system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the testing database 108 and the testing plan design system 110 or components thereof (e.g., the test log vectorization logic 112, the test case clustering logic 114 and the test case selection logic 116) may be implemented on respective distinct processing platforms, although numerous other arrangements are possible. For example, in some embodiments at least portions of the testing plan design system 110 and one or more of the client devices 102, the IT infrastructure 105 and/or the testing database 108 are implemented on the same processing platform. A given client device (e.g., 102-1) can therefore be implemented at least in part within at least one processing platform that implements at least a portion of the testing plan design system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the testing database 108 and the testing plan design system 110, or portions or components thereof, to reside in different data centers. Numerous other distributed implementations are possible. The testing plan design system 110 can also be implemented in a distributed manner across multiple data centers.

Additional examples of processing platforms utilized to implement the testing plan design system 110 and other components of the information processing system 100 in illustrative embodiments will be described in more detail below in conjunction with FIGS. 9 and 10.

It is to be appreciated that these and other features of illustrative embodiments are presented by way of example only, and should not be construed as limiting in any way.

It is to be understood that the particular set of elements shown in FIG. 1 for hierarchical clustering of test cases for use in generating testing plans for IT assets is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for hierarchical clustering of test cases for use in generating testing plans for IT assets will now be described in more detail with reference to the flow diagram of FIG. 2. It is to be understood that this particular process is only an example, and that additional or alternative processes for hierarchical clustering of test cases for use in generating testing plans for IT assets may be used in other embodiments.

In this embodiment, the process includes steps 200 through 208. These steps are assumed to be performed by the testing plan design system 110 utilizing the test log vectorization logic 112, the test case clustering logic 114 and test case selection logic 116. The process begins with step 200, obtaining a set of testing logs generated by executing a plurality of test cases on one or more of a plurality of IT assets (e.g., 106) of an IT infrastructure (e.g., 105). The plurality of IT assets of the IT infrastructure may comprise at least one of: one or more physical computing resources and one or more virtual computing resources; and software running on at least one of one or more physical computing resources and one or more virtual computing resources. The set of testing logs may comprise at least one of: one or more test case execution logs generated by the plurality of test cases; and one or more system logs generated in conjunction with execution of the plurality of test cases on the one more of the plurality of IT assets of the IT infrastructure. A given testing log in the set of testing logs may specify: one or more of the testing actions taken during execution of at least one of the plurality of test cases; a reaction of the one or more of the plurality of IT assets of the IT infrastructure to the one or more testing plans; and at least one of a hardware and a software configuration of the one or more of the plurality of IT assets of the IT infrastructure.

Figure 2:
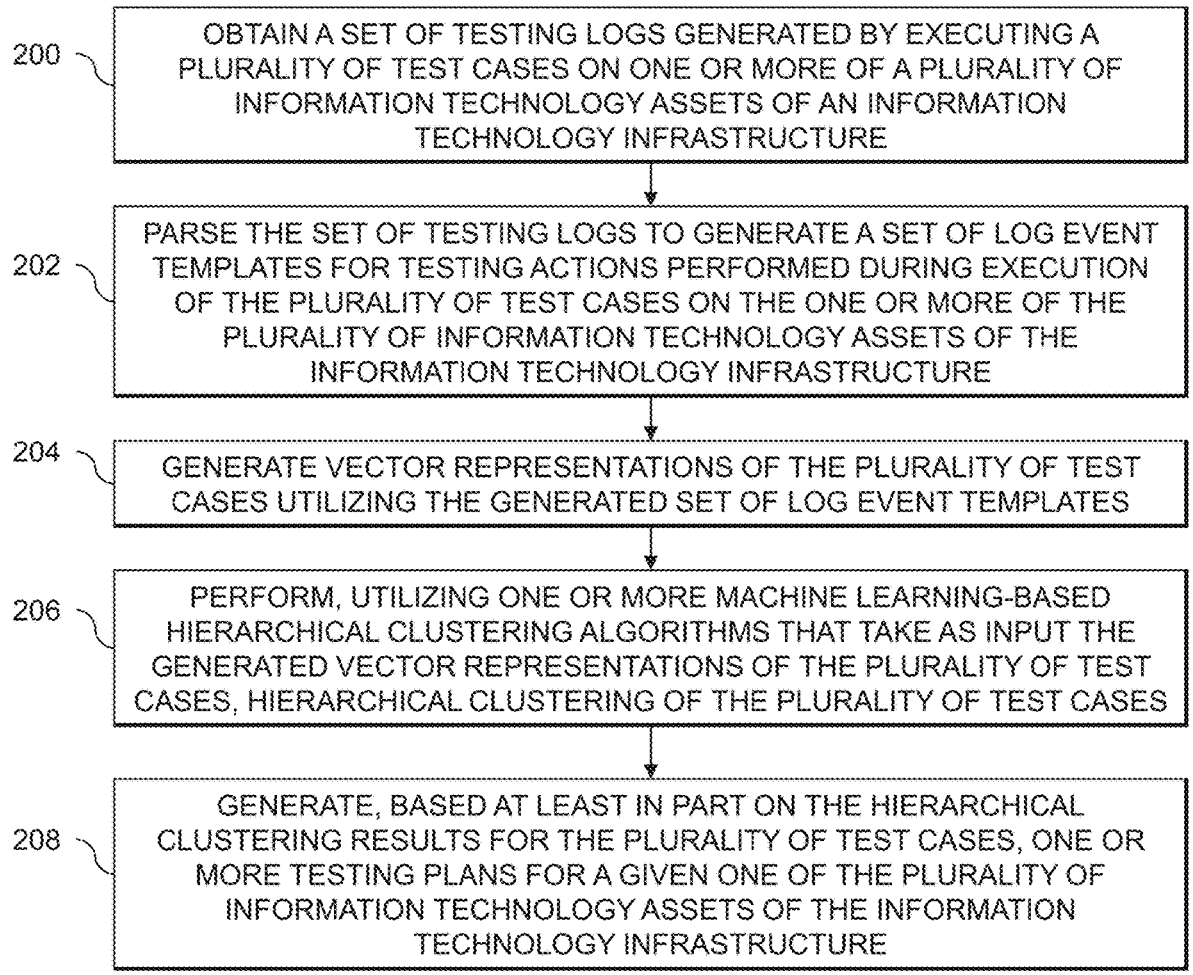
FIG. 2 is a flow diagram of an exemplary process for hierarchical clustering of test cases for use in generating testing plans for information technology assets in an illustrative embodiment.

The FIG. 2 process continues with step 202, parsing the set of testing logs to generate a set of log event templates for testing actions performed during execution of the plurality of test cases on the one or more of the plurality of IT assets of the IT infrastructure. Step 202 may comprise, for a given testing log in the set of testing logs: identifying a plurality of log events in the given testing log; for each of the plurality of log events in the given testing log, extracting constant portions and removing one or more variables therefrom; and converting the extracted constant portions of each of the plurality of log events in the given testing log to a given one of a plurality of log event templates. In step 204, vector representation of the plurality of test cases are generated utilizing the set of log event templates. Step 204 may comprise creating a log event template dictionary, the log event template dictionary comprising a deduplicated set of log event templates utilized in the plurality of test cases, and translating each of the testing logs into a log vector utilizing the log event template dictionary. The log event template dictionary may comprise a designated padding element, and translating each of the testing logs into a log vector utilizing the log event template dictionary may comprise translating each of the testing logs into an equally dimensioned log vector by padding log vectors less than a length of the longest log vector with additional entries of the designated padding element.

Hierarchical clustering of the plurality of test cases is performed in step 206 utilizing one or more machine learning-based hierarchical clustering algorithms that take as input the generated vector representations of the plurality of test cases. Step 206 may comprise initializing each of the plurality of test cases as a corresponding cluster in a first level of a cluster hierarchy, calculating linkages between each of the plurality of clusters in the first level of the cluster hierarchy, and clustering subsets of the plurality of test cases in a second level of the cluster hierarchy based at least in part on the calculated linkages. Calculating the linkages may comprise computing distance metrics between the generated vector representations of the plurality of test cases. The calculated linkages may comprise at least one of single linkages, complete linkages and average linkages.

In step 208, one or more testing plans for a given one of the plurality of IT assets of the IT infrastructure are generated based at least in part on the hierarchical clustering results for the plurality of test cases. Step 208 may comprise, for a given one of the one or more testing plans, selecting a deduplicated subset of the plurality of test cases for inclusion in the given testing plan that provides coverage of a designated set of testing points. Step 208 may also or alternatively comprise, for a given one of the one or more testing plans, selecting a subset of the plurality of test cases for inclusion in the given testing plan that provides feature coverage for a designated set of features of a product to be tested by the given testing plan. Step 208 may further or alternatively comprise, for a given one of the one or more testing plans, selecting a sequence of two or more subsets of the plurality of test cases for inclusion in the given testing plan. The selected sequence of the two or more subsets of the plurality of test cases is determined based at least in part on the hierarchical clustering results for the plurality of test cases. The sequence of the two or more subsets of the plurality of test cases may comprise: a first subset of test cases that is to be executed first, the first subset of the test cases testing a first subset of features of a product to be tested by the given testing plan; and at least a second subset of test cases that is to be executed following the first subset of test cases passing, the second subset of the test cases testing a second subset of the features of the product to be tested by the given testing plan.

Illustrative embodiments provide techniques for intelligent identification of test cases for testing of IT infrastructure and assets thereof. In some embodiments, the intelligent identification of tests cases utilizes hierarchical clustering that is based at least in part on analysis of system testing logs (also referred to simply as "testing logs") to optimize or improve test case design. The techniques described herein further provide approaches for de-duplication of test cases in testing plans, discovering testing gaps in testing plans, and providing smart or intelligent suggestions on dynamic test case selection for testing plans. Log based vectorization may be used to reflect the test case design and automation execution of sequential test cases. The test case analysis mechanisms described herein provide various improvements and efficiencies, reducing manual effort and supporting more large-scale test case analysis that is not practical to perform for human analysts.

In the testing of large and complex products, such as IT assets in an IT infrastructure, system testing may involve the scheduling of testers, hardware, software and many other resources. There may be many test cases (e.g., more than a thousand, more than ten thousand, etc.) to be tested before product development and release. The number of test cases will continue to increase, and the test cases used may be modified based on changes in functions of a product being tested. Due to unclear design ideas and test case descriptions, among other reasons, different test cases may be at least partial duplicates of one another (e.g., two or more test cases may have overlap in coverage of test contents). Further, the test cases may provide only partial coverage. Therefore, there are significant difficulties in selecting a reasonable test case set (e.g., affecting a series of results, such as test manpower and material cost, testing time, product problem efficiency, etc.).

Conventional approaches for test case selection may select from among existing test cases according to a tester's (e.g., a human user's) understanding of test cases and experience in test planning. Various factors affect the selection of test case sets, including the complexity of the product to be tested, the correctness of information available to the tester selecting the test cases, the experience or knowledge of the tester selecting the test cases, etc. Such issues are exacerbated when the test objects are complex, and as the number of test cases increases. It is unrealistic to expect or require a tester to deeply understand, analyze and correctly select all test cases manually. When selecting test cases, a tester may choose an inappropriate test case set (e.g., which results in repeated or duplicate testing, missing testing coverage, etc.) resulting in waste of resources and low efficiency of product testing. There is thus a need for efficient methods to extract the real testing steps and feature paths of test cases, to help select a more effective test case set, and to greatly improve testing efficiency.

Test cases may use natural language to describe test objectives, test processes, and expected results. Generally, system testers select test cases according to the content described by such natural language test case descriptions. The test case descriptions may be highly related to language usage habits, detail and accuracy of the designers writing the test case descriptions, etc. If there is ambiguity or inaccuracy in test case descriptions, testers can be misled in choosing appropriate test cases. In addition, different test cases and associated test case descriptions may have overlapping test points, and testers may not be able to distinguish or record all overlapping parts in detail. As a result, when a tester must manually select a large-scale test case set (e.g., thousands of test cases or more), there may be many repeated tests, or the selected tests may miss coverage of target points.

Since test case descriptions have many problems in accurately judging test points, this can affect accuracy in approaches which rely solely or primarily on test case descriptions for test case selection. There is thus a need to find an accurate and unified description of test points and operations of test cases. In some embodiments, testing logs are used in addition to or in place of test case descriptions. Testing logs include product system logs which are generated when test cases are executing, in addition to or in place of test case execution logs. Such product system logs advantageously include test actions as well as the system's reaction to the test actions (e.g., including information such as hardware configuration, function, execution sequence, IO mode, etc.). Test event content and timing in testing logs can well reflect the test points and operation steps of test cases, and this correspondence will not change with the execution time or the description of the test cases. In other words, the essential correspondence between the testing logs and the test cases is one-to-one and unique.

With the popularity of automated testing, testing logs can provide a large amount of original and effective data for in-depth analysis of test cases. Some internal relationships in testing logs (e.g., which may have large numbers of log events) are not easy to detect by human eyes, and thus manual comparison and analysis of testing logs is not feasible to do and leads to various inaccuracies. Machine learning technology can help deal with massive data inline relationships. Testing logs, however, are free-form text (e.g., unstructured text data) and thus cannot be used directly as input for any machine learning. In some embodiments, log vectorization processes and natural language processing (NLP) are used to transform testing logs into a format suitable for use as input to one or more machine learning algorithms. The NLP may be used to extract log features, which can vectorize testing log vocabulary. Log event vectors can then be obtained through custom log event templates. The testing logs, following such NLP and vectorization processing, can be input to one or more machine learning algorithms that clusters test cases. The resulting test case clusters based on log event vectorization can be used for various different optimization fields, including but not limited to: de-duplication of highly similar test cases; analyzing the test coverage of existing test case sets and the hit rates of key testing features; and recommending appropriate test cases for test case sets throughout a process of iterative product development according to the characteristic development maturity of the products being tested.

Some embodiments provide a smart test case identification system that is based at least in part on hierarchical clustering results produced from analysis of testing logs in order to optimize test case design and selection of test cases for testing plans. The smart test case identification system may include functionality for parsing and vectorization of testing logs, test case clustering, and test case set optimization.

Figure 3:
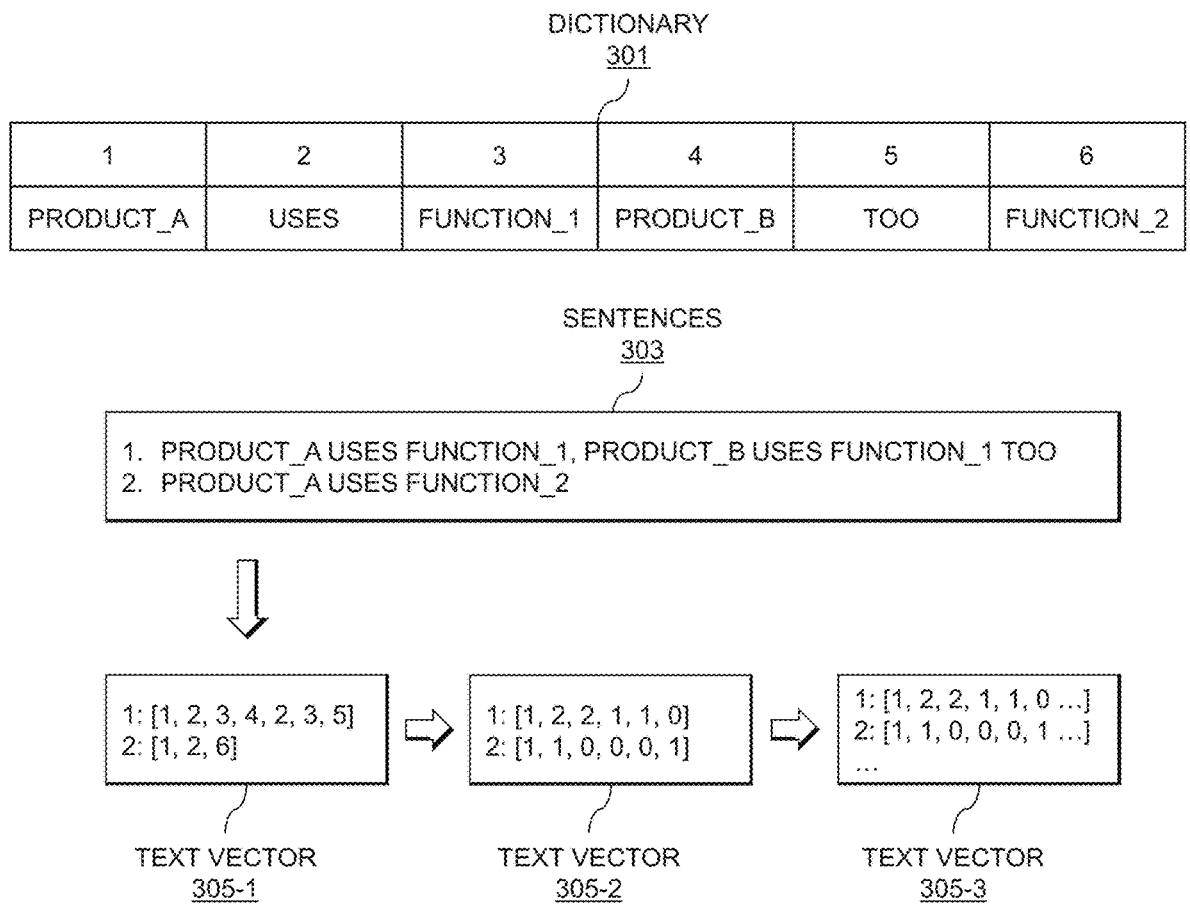
FIG. 3 shows a text vectorization using bag-of-words natural language processing in an illustrative embodiment.

Testing log vectorization will now be described. Various NLP methods may be used for text vectorization, including bag-of-words, word2vec, etc. Text vectorization models may create an index of each word, and then use such indexes for representing sentences. FIG. 3, for example, shows a process for bag-of-words text vectorization, in which a dictionary 301 is generated from a set of sentences 303, which are converted into sets of text vectors 305-1, 305-2 and 305-3. The text vector set 305-1 has the problem that the different sentences have different vector dimensions, which is not suitable for input to machine learning algorithms. The text vector set 305-1 can thus be transformed to text vector set 305-2, which includes 6-dimension vectors for each of the sentences (e.g., using each word frequency in one sentence instead of index of words). This is used for bag-of-words text vectorization. Word2vec may be used because bag-of-words text vectorization cannot reflect the word relationships, and human-being word corpus is voluminous which induces vector dimensions that are too large to be feasibly calculated in any algorithm. In a system testing environment, the testing logs are semi-structured and have limited word description. Time sequence is also important to testing logs. In some embodiments, a modified bag-of-words text vectorization approach is used which eliminates its disadvantages such that is suitable for application in log-based test case identification scenarios.

Individual words in testing logs do not always make sense (e.g., they are not in a human-readable form). One log sentence can be looked at or considered as a log event. The whole testing log feature is dependent not only on individual log events, but also on log event sequence, frequency, inter-arrival time (e.g., mean inter-arrival time), time-interval spread, etc. Conventional log vectorization models cannot avoid coordinate transformation (e.g., from words to logs, and logs to sequences), and also have a high computing cost (e.g., for training) which may be prohibitive for large-scale testing environments. Conventional log vectorization models, which may be designed for log anomaly detection, can abstract features and is not the aim for test case comparison.

Figure 4:
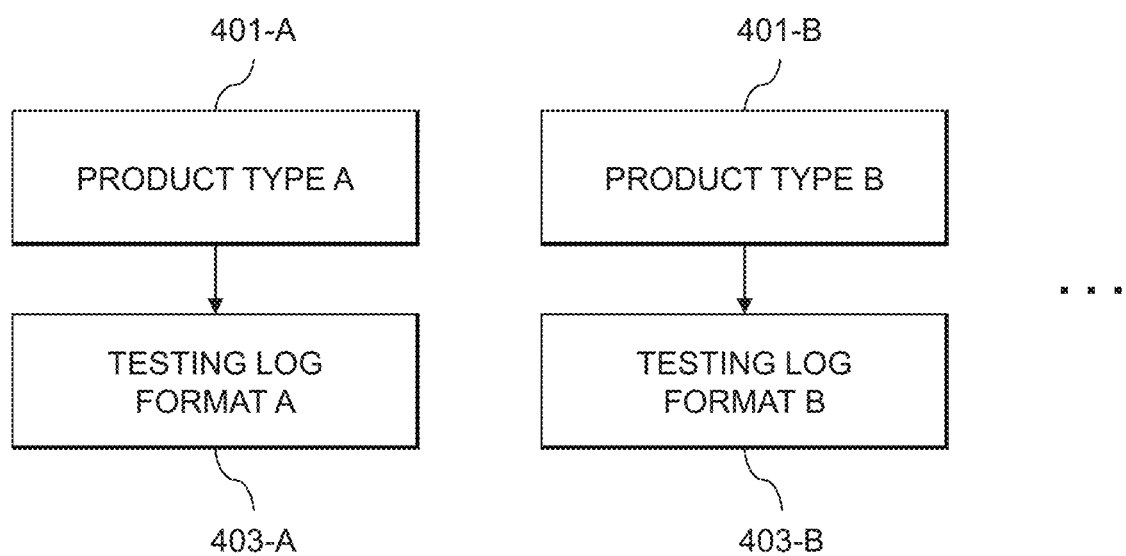
FIG. 4 shows examples of different product types having different associated test log formats in an illustrative embodiment.

Different testing logs (e.g., for different products) may have their own formats and templates. FIG. 4, for example, shows two product types 401-A and 401-B having different associated testing log formats 403-A and 403-B. The product type 401-A, for example, may be an Internet server having an associated testing log format 403-A that is focused on information transformation. The product type 401-B may be a storage-related product having an associated testing log format 403-B that is focused on logic events. Various other examples are possible. Identifying the log format and associated log template to use for a particular testing log according to its log structure is important for pre-processing.

In some embodiments, log vectorization extracts constant parts from log items. Consider, as an example, the following log item:

"A_QA_ACTION [KILL:Appliance-WX-D0579-node-A-PM] Finished-Killing Appliance-WX-D0579-node-A-PM: pid=16752 uptime=1/11/2021 13:33:52 killSig=6"

will be structured to the following log event template:

"*_QA_ACTION [KILL:*-PM] Finished-Killing Appliance-*-PM: pid=*uptime=*killSig=6".

A testing log can be transformed into a combination of several log event templates, with the general principle of the log event templates being that variables (e.g., numbers, object names, etc.) are ignored while retaining the logic and other portions of the log event. The process of parsing testing logs to generate log event templates can be represented as:

$$LT = \begin{bmatrix} A(l_1) \\ \vdots \\ A(l_N) \end{bmatrix} = \begin{bmatrix} ET_1 \\ ET_2 \\ ET_3 \\ \vdots \\ ET_N \end{bmatrix}$$

where l denotes one line of a raw log message, N denotes the total number of lines of the raw log message, $l_i$ denotes the ith line of the raw log message, where $1 \leq i \leq N$, A denotes a function which is used to transfer each line to the log event template as described above, ET denotes a log event template, and LT denotes a set of log event templates, referred to as a log template.

Generation of log vectors will now be described. Let X denote the total number of test cases. After parsing all the testing logs as described above, the resulting test case log templates are represented as:

$$LT_K = \begin{bmatrix} ET_{k1} \\ ET_{k2} \\ \vdots \\ ET_{k_j} \\ \vdots \\ ET_{kN} \end{bmatrix}, (1 \leq k \leq X)$$

Individual ETs, or multiple LTs, will be duplicated since system log event templates are limited and different test cases may invoke similar test steps. The length of the deduplicated test case set, $d_m$, will be the capacity of the log event dictionary:

$$d_m = Len(\text{Dedup}(LT_k))$$

In some cases, a product being tested may have a number of unique log events which is too large (e.g., inducing the dictionary to be too long such that it cannot be processed feasibly using available computing resources). In such cases, the most sensitive events may be filtered out such that log messages not relevant to test case steps can be ignored.

The process for log vector generation may include creating a log event template dictionary ($1 \leq i \leq d_m$), and translating the log template by this dictionary utilizing a function denoted D, as shown in the table 500 of FIG. 5. FIG. 5 also shows examples of log event templates 505 converted using the dictionary and function D. The different lengths of the log event templates 505 reflect that the lengths of the raw log messages are different. The maximum length of the raw log messages may be determined according to:

$$M = \text{Maximum}(N_k), 1 \leq k \leq X$$

Log event templates shorter than the maximum length may be filled out using 0 values, so the dictionary may add a 0 element as shown in the table 510 of FIG. 5. Each log template can be vectorized according to:

$$LT_K = \begin{cases} [D(ET_i)_1, \ldots, D(ET_i)_{N_K}] (N_k = M) \\ [D(ET_i)_1, \ldots, D(ET_i)_{N_K}, D(ET_0)_1 \ldots D(ET_0)_M] (N_k < M) \end{cases}$$

where LT denotes a log template, k denotes the kth test case log template, where $1 \leq k \leq X$ and X denotes the total number of test cases. D denotes a function for translating log event templates to a vector utilizing a created dictionary. ET denotes a log event template, and i denotes the ith log event template in a deduplicated log event template set, where $1 \leq i \leq d_m$ and $d_m$ denotes the length of deduplicated log event template set. $N_k$ denotes the total number of lines of the kth test case log template, M denotes the total number of lines of the longest test case log template. The log vectors can naturally show the test events sequence, and the log vectors' dimension is M, which should not be a voluminous un-calculated number. The dictionary capacity may also be customized such that it is acceptable in different product areas. An example of log vectorization for a set of raw testing logs is illustrated in FIGS. 6A-6E. FIGS. 6A and 6B show portions 600-1 and 600-2 of raw testing logs (collectively, raw testing logs 600). The raw testing logs 600 include 38 lines. FIGS. 6C and 6D show portions 605-1 and 605-2 where variables in the portions 600-1 and 600-2 are highlighted. FIG. 6E shows a deduplicated log event template set 610, including 14 log event templates. FIG. 6E also shows a raw log vector 615 for the log event template set 610.

After testing log vectors are generated, one or more clustering algorithms may be applied. The clustering algorithms may include artificial intelligence (AI) or machine learning (IL) algorithms. In some embodiments, hierarchical clustering is utilized since, before log computation, it is not known how many clusters there will be and the aim is to gather similar test cases (rather than deleting test cases). Hierarchical clustering, also referred to as hierarchical cluster analysis, is an algorithm that groups similar objects into clusters. The endpoint of hierarchical clustering is a set of clusters, where each cluster is distinct from each other cluster, and the objects within each cluster are broadly like each other. When log vectors are provided, distance between the log vectors may be computed (e.g., using Euclidean distance). The output of hierarchical clustering may be in the form of a dendrogram, which shows the hierarchical relationships between the clusters. Hierarchical clustering may include the following steps:

1. Initialization: each sample (e.g., each log vector) is taken as a cluster.
2. Calculate linkages: using a distance metric (e.g., Euclidean distance), determine linkages among the clusters. The linkages may be calculated using various different methods, including but not limited to single linkage, complete linkage, average linkage, etc.
3. Clustering: determine the closest clusters based at least in part on the calculated linkages, and merge the closest clusters in a hierarchy of clusters.
4. Repeat steps 2 and 3 until reaching a single cluster at the highest level of the hierarchy of clusters. The resulting hierarchy of clusters may be used as input for test case selection and test plan improvement.

Continuing with the example of FIGS. 6A-6E, hierarchical clustering of test cases will be described using fourteen test cases as source data. After parsing out the log event templates from the raw testing logs, only those log events which will significantly influence test output are kept. Log events which will significantly influence the test output may include, for example, log events corresponding to test step actions and flows, hardware information, IO patterns, etc. Repeated temporary information such as network glitches may be filtered out or dropped. Trigger operations and system reactions may be combined. Application of these filtering actions can induce the test case vector dimensionality significantly and log event dictionary width as well as keeping the test case features. For clarity of illustration, seven log event templates in a period are chosen to describe one test case, and suppose that there are twenty log event types during this time period.

Figure 7B:
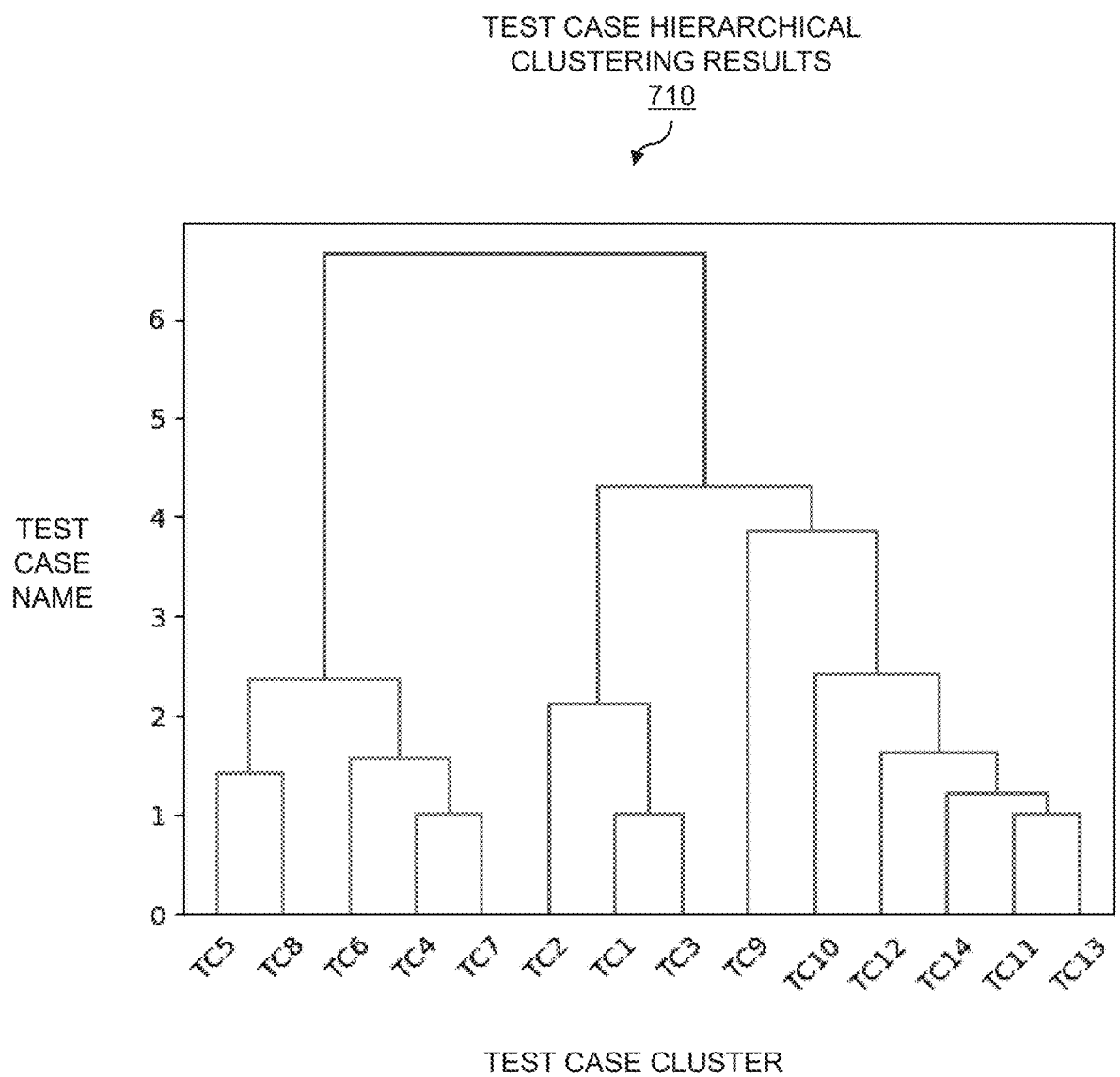

FIG. 7A shows a table 700 showing a test case significant log event dictionary, as well as a table 705 illustrating fourteen test case vectors. FIG. 7B shows a chart 710 of hierarchical test case clustering results using the test case vectors of table 705. The hierarchical test case clustering results shown in chart 710 are produced using average linkage for the cluster linkage calculations. The test case data set requires accurate results for following test design inputs and controlling overall computation costs. In the chart 710, the vertical axis stands for the sample (e.g., the individual test case names T1, T2, . . . T7 in the table 705), and the horizontal axis stands for the distances (e.g., Euclidean distance) of the test case clusters (the test case clusters TC1, TC2, . . . TC14 in the table 705).

The test case hierarchical clustering results shown in chart 710 can provide various useful information for designing testing plans. For example, the chart 710 illustrates that test case clusters TC4 and TC7 have a distance lower than 1, which means that there is a high possibility that the test case clusters TC4 and TC7 have at least some overlap or duplication in testing points. During test case refining, the test case clusters TC4 and TC7 can thus be evaluated to reconsider their respective test purposes and test steps (e.g., to avoid overlap or duplication in testing points).

As another example, testing plan design may choose test case clusters with higher distance from one another as a quick and efficient way for choosing test cases for inclusion in a testing plan that maximizes testing coverage (e.g., selecting test case clusters TC4, TC2 and TC10 will be more efficient than selecting test case clusters T11, T13 and T14 for maximizing testing coverage). Consider a constraint or requirement that a testing plan can include only three test cases. Given this constraint, it is more efficient to select one test case from each of test case clusters TC4, TC2 and TC10 rather than selecting one test case from each of test case clusters T11, T13 and T14 for maximizing testing coverage.

As a further example, different test case clusters can stand for or represent different product module testing points. At an early stage of testing, it may be sufficient to run one (or a few) test cases from each of the test case clusters TC6, TC1 and TC10. If those selected tests pass, additional or future test cases can be selected from the test case clusters TC6, TC1 and TC10 (or other ones of the test case clusters) in order to verify more details in different product module testing points.

Figure 8:
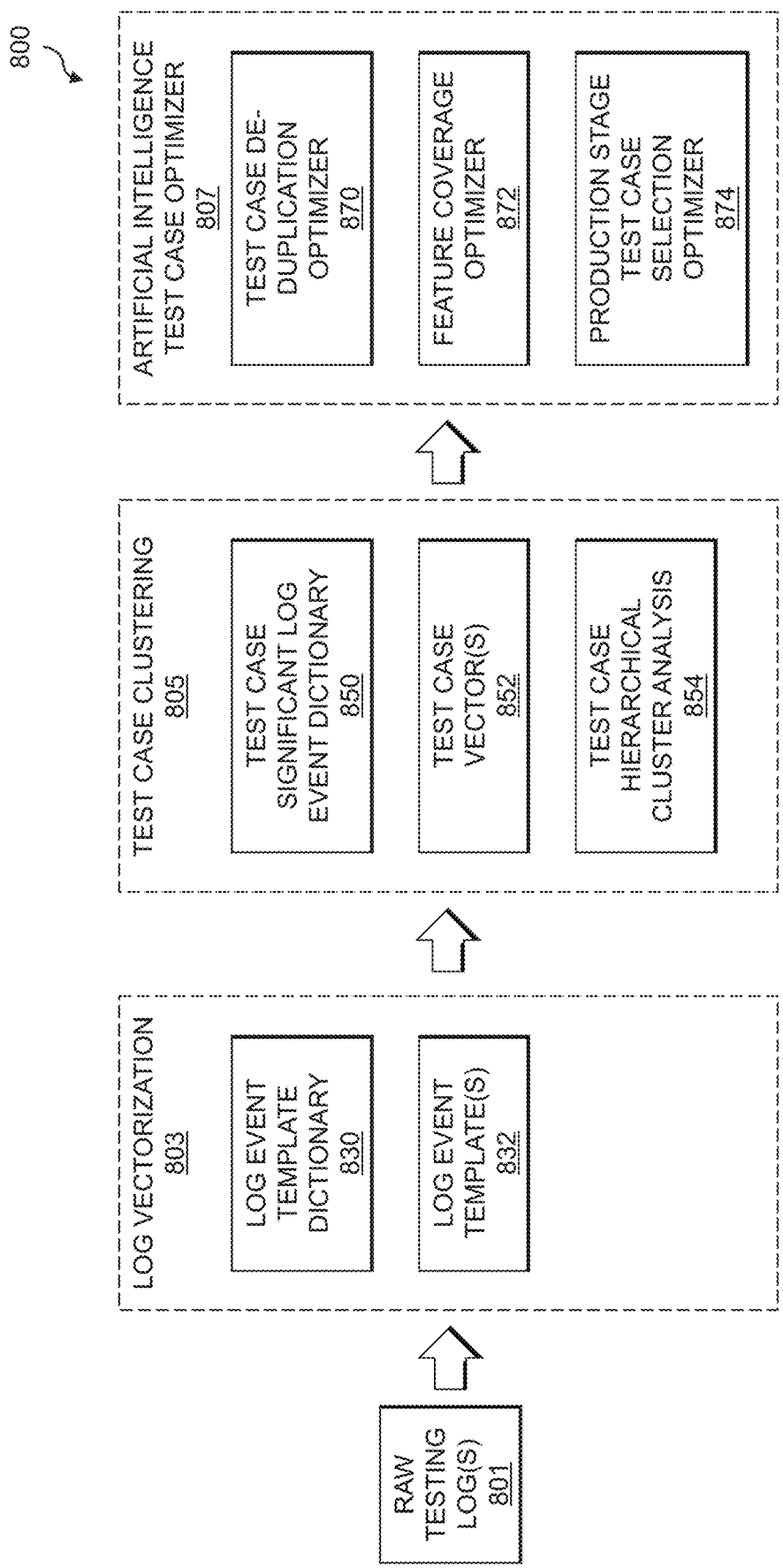
FIG. 8 shows a process flow for test case analysis and selection in an illustrative embodiment.

FIG. 8 shows an overall process flow 800 for test case analysis and selection. The process flow 800 begins with a set of raw testing logs 801, which are then processed in a log vectorization stage 803. In the log vectorization stage 803, a log event template dictionary 830 is used to parse the raw testing logs 801 to identify a set of log event templates 832 (e.g., as shown and described above in conjunction with FIG. 5). The process flow 800 then proceeds to a test case clustering stage 805. In the test case clustering stage 805, a test case significant log event dictionary 850 is used to generate a set of test case vectors 852 which are analyzed to produce test case hierarchical cluster analysis results 854 (e.g., as shown and described above in conjunction with FIGS. 7A and 7B).

The process flow 800 then proceeds to an AI test case optimizer stage 807. In the AI test case optimizer stage 807, various optimizers are used to design testing plans based on the test case hierarchical cluster analysis results 854 produced in the test case clustering stage 805. Such optimizers may include, but are not limited to, a test case de-duplication optimizer 870, a feature coverage optimizer 872, and a production stage test case selection optimizer 874. The test case de-duplication optimizer 870 may be used to determine a de-duplicated test case set (e.g., a set of test cases with reduced overlap in testing coverage). The feature coverage optimizer 872 may be used to determine a set of test cases that provides an optimal or improved feature coverage among desired testing points. The production stage test case selection optimizer 874 may be used to determine a set of test cases based on product development maturity of the product to be tested. As described above, for example, a limited set of test cases may be selected initially or early in product development, and if such tests pass, the product development may continue where additional test cases may be selected and run, and so on.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for hierarchical clustering of test cases for use in generating testing plans for IT assets will now be described in greater detail with reference to FIGS. 9 and 10. Although described in the context of information processing system 100, these platforms may also be used to implement at least portions of other information processing systems in other embodiments.

Figure 9:
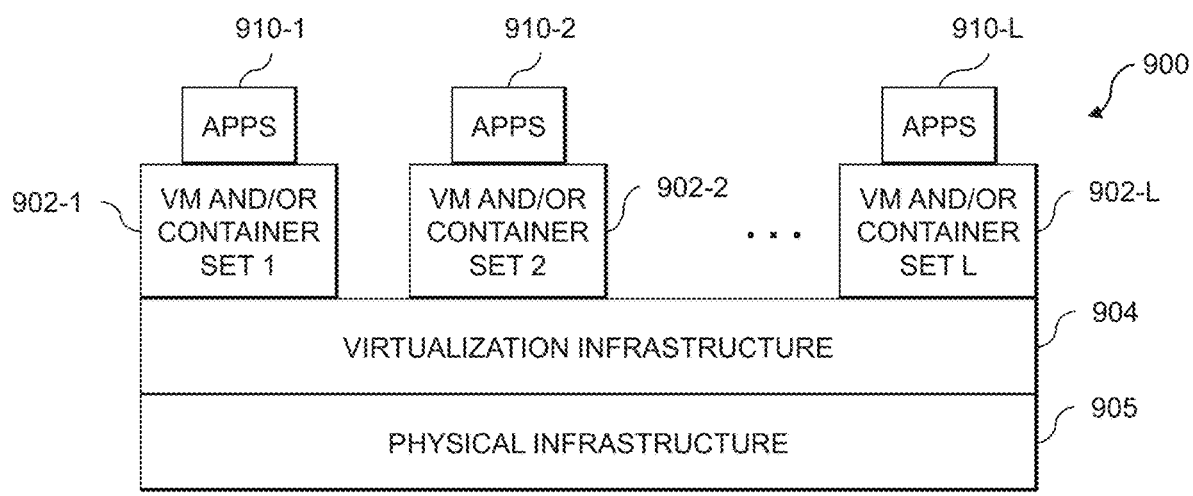
FIGS. 9 and 10 show examples of processing platforms that may be utilized to implement at least a portion of an information processing system in illustrative embodiments.
Figure 10:
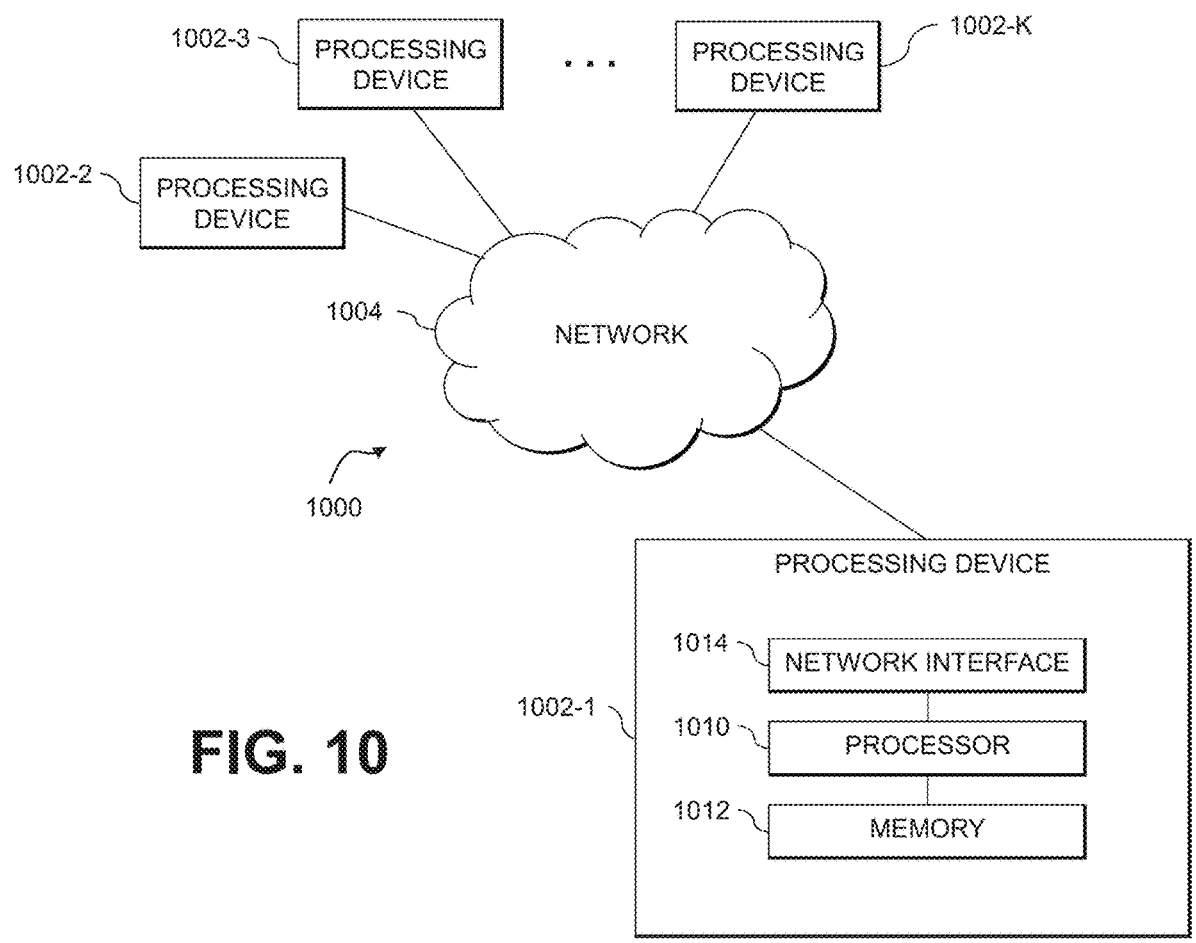

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of information processing system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for hierarchical clustering of test cases for use in generating testing plans for IT assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, testing logs, test cases, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   obtaining a set of testing logs generated by executing a plurality of test cases on one or more of a plurality of information technology assets of an information technology infrastructure;
   parsing the set of testing logs to generate a set of log event templates for testing actions performed during execution of the plurality of test cases on the one or more of the plurality of information technology assets of the information technology infrastructure;
   generating vector representations of the plurality of test cases utilizing the generated set of log event templates;
   performing, utilizing one or more machine learning-based hierarchical clustering algorithms that take as input the generated vector representations of the plurality of test cases, hierarchical clustering of the plurality of test cases;
   generating, based at least in part on hierarchical clustering results for the plurality of test cases, one or more testing plans for a given one of the plurality of information technology assets of the information technology infrastructure; and
   executing the one or more testing plans on the given one of the plurality of information technology assets of the information technology infrastructure.

2. The apparatus of claim 1 wherein the plurality of information technology assets of the information technology infrastructure comprises at least one of:
   one or more physical computing resources and one or more virtual computing resources; and
   software running on at least one of one or more physical computing resources and one or more virtual computing resources.

3. The apparatus of claim 1 wherein the set of testing logs comprises at least one of:
   one or more test case execution logs generated by the plurality of test cases; and
   one or more system logs generated in conjunction with execution of the plurality of test cases on the one more of the plurality of information technology assets of the information technology infrastructure.

4. The apparatus of claim 1 wherein a given testing log in the set of testing logs specifies:
   one or more of the testing actions taken during execution of at least one of the plurality of test cases;
   a reaction of the one or more of the plurality of information technology assets of the information technology infrastructure to the one or more testing actions; and
   at least one of a hardware and a software configuration of the one or more of the plurality of information technology assets of the information technology infrastructure.

5. The apparatus of claim 1 wherein parsing the set of testing logs to generate the set of log event templates comprises, for a given testing log in the set of testing logs:
   identifying a plurality of log events in the given testing log;
   for each of the plurality of log events in the given testing log, extracting constant portions and removing one or more variables therefrom; and
   converting the extracted constant portions of each of the plurality of log events in the given testing log to a given one of a plurality of log event templates.

6. The apparatus of claim 1 wherein generating the vector representations of the plurality of test cases utilizing the generated set of log event templates comprises:
   creating a log event template dictionary, the log event template dictionary comprising a deduplicated set of log event templates utilized in the plurality of test cases; and
   translating each of the testing logs into a log vector utilizing the log event template dictionary.

7. The apparatus of claim 6 wherein the log event template dictionary comprises a designated padding element, and wherein translating each of the testing logs into a log vector utilizing the log event template dictionary comprises translating each of the testing logs into an equal dimensioned log vector by padding log vectors less than a length of the longest log vector with additional entries of the designated padding element.

8. The apparatus of claim 1 wherein performing the hierarchical clustering of the plurality of test cases comprises:
   initializing each of the plurality of test cases as a corresponding one of a plurality of clusters in a first level of a cluster hierarchy;
   calculating linkages between each of the plurality of clusters in the first level of the cluster hierarchy; and
   clustering subsets of the plurality of test cases in a second level of the cluster hierarchy based at least in part on the calculated linkages.

9. The apparatus of claim 8 wherein calculating the linkages comprises computing distance metrics between the generated vector representations of the plurality of test cases.

10. The apparatus of claim 8 wherein the calculated linkages comprise at least one of single linkages, complete linkages and average linkages.

11. The apparatus of claim 1 wherein generating a given one of the one or more testing plans comprises selecting a deduplicated subset of the plurality of test cases for inclusion in the given testing plan that provides coverage of a designated set of testing points, the deduplicated subset of the plurality of test cases being determined based at least in part on the hierarchical clustering results for the plurality of test cases.

12. The apparatus of claim 1 wherein generating a given one of the one or more testing plans comprises selecting a subset of the plurality of test cases for inclusion in the given testing plan that provides feature coverage for a designated set of features of a product to be tested by the given testing plan, the selected subset of the plurality of test cases being determined based at least in part on the hierarchical clustering results for the plurality of test cases.

13. The apparatus of claim 1 wherein generating a given one of the one or more testing plans comprises selecting a sequence of two or more subsets of the plurality of test cases for inclusion in the given testing plan, the selected sequence of the two or more subsets of the plurality of test cases being determined based at least in part on the hierarchical clustering results for the plurality of test cases, wherein the sequence of the two or more subsets of the plurality of test cases comprises:
  a first subset of test cases that is to be executed first, the first subset of the test cases testing a first subset of features of a product to be tested by the given testing plan; and
  at least a second subset of test cases that is to be executed following the first subset of test cases passing, the second subset of the test cases testing a second subset of the features of the product to be tested by the given testing plan.

14. The apparatus of claim 13 wherein executing the given testing plan on the given one of the plurality of information technology assets of the information technology infrastructure comprises executing the two or more subsets of the plurality of test cases in accordance with the selected sequence.

15. A computer program product comprising a non-transitory processor-readable storage medium having stored therein program code of one or more software programs, wherein the program code when executed by at least one processing device causes the at least one processing device to perform steps of:
  obtaining a set of testing logs generated by executing a plurality of test cases on one or more of a plurality of information technology assets of an information technology infrastructure;
  parsing the set of testing logs to generate a set of log event templates for testing actions performed during execution of the plurality of test cases on the one or more of the plurality of information technology assets of the information technology infrastructure;
  generating vector representations of the plurality of test cases utilizing the generated set of log event templates;
  performing, utilizing one or more machine learning-based hierarchical clustering algorithms that take as input the generated vector representations of the plurality of test cases, hierarchical clustering of the plurality of test cases; and
  generating, based at least in part on hierarchical clustering results for the plurality of test cases, one or more testing plans for a given one of the plurality of information technology assets of the information technology infrastructure.

16. The computer program product of claim 15 wherein generating a given one of the one or more testing plans comprises selecting a deduplicated subset of the plurality of test cases for inclusion in the given testing plan that provides coverage of a designated set of testing points, the deduplicated subset of the plurality of test cases being determined based at least in part on the hierarchical clustering results for the plurality of test cases.

17. The computer program product of claim 15 wherein generating a given one of the one or more testing plans comprises selecting a subset of the plurality of test cases for inclusion in the given testing plan that provides feature coverage for a designated set of features of a product to be tested by the given testing plan, the selected subset of the plurality of test cases being determined based at least in part on the hierarchical clustering results for the plurality of test cases.

18. A method comprising:
  obtaining a set of testing logs generated by executing a plurality of test cases on one or more of a plurality of information technology assets of an information technology infrastructure;
  parsing the set of testing logs to generate a set of log event templates for testing actions performed during execution of the plurality of test cases on the one or more of the plurality of information technology assets of the information technology infrastructure;
  generating vector representations of the plurality of test cases utilizing the generated set of log event templates;
  performing, utilizing one or more machine learning-based hierarchical clustering algorithms that take as input the generated vector representations of the plurality of test cases, hierarchical clustering of the plurality of test cases; and
  generating, based at least in part on hierarchical clustering results for the plurality of test cases, one or more testing plans for a given one of the plurality of information technology assets of the information technology infrastructure;
  wherein the method is performed by at least one processing device comprising a processor coupled to a memory.

19. The method of claim 18 wherein generating a given one of the one or more testing plans comprises selecting a deduplicated subset of the plurality of test cases for inclusion in the given testing plan that provides coverage of a designated set of testing points, the deduplicated subset of the plurality of test cases being determined based at least in part on the hierarchical clustering results for the plurality of test cases.

20. The method of claim 18 wherein generating a given one of the one or more testing plans comprises selecting a subset of the plurality of test cases for inclusion in the given testing plan that provides feature coverage for a designated set of features of a product to be tested by the given testing plan, the selected subset of the plurality of test cases being determined based at least in part on the hierarchical clustering results for the plurality of test cases.

* * * * *